United States Patent [19]
Khanna

[11] 3,961,208
[45] June 1, 1976

[54] TEMPERATURE COMPENSATION FOR REGULATOR CIRCUIT
[75] Inventor: Rakesh Khanna, Parsippany, N.J.
[73] Assignee: Litton Business Systems, Inc., Morris Plains, N.J.
[22] Filed: Feb. 11, 1974
[21] Appl. No.: 441,436

[52] U.S. Cl............................. 307/297; 307/254; 307/318
[51] Int. Cl.² .................... H03K 17/00; H03K 1/12
[58] Field of Search .......... 307/310, 254, 318, 297; 357/22; 330/13

[56] References Cited
UNITED STATES PATENTS

| | | | |
|---|---|---|---|
| 3,248,572 | 4/1966 | Widmer | 307/310 |
| 3,268,739 | 8/1966 | Dickson, Jr. | 307/310 |
| 3,315,254 | 4/1967 | Rockey | 307/310 |
| 3,413,438 | 11/1968 | Gardner et al. | 307/310 |

OTHER PUBLICATIONS

Expanded Scale Voltmeter, by Trainor Tech. Digest, No. 2, 4/66, Western Electric, pp. 27 & 28.

Primary Examiner—Stanley D. Miller, Jr.
Assistant Examiner—B. P. Davis
Attorney, Agent, or Firm—Robert F. Rotella; Norman Friedman; Stephen A. Roen

[57] ABSTRACT

A temperature compensated regulator circuit makes use of the net positive temperature coefficient of voltage characteristic of a pair of back-to-back zener diodes to compensate for the negative voltage temperature coefficient of the base-to-emitter junction of a transistor.

6 Claims, 1 Drawing Figure

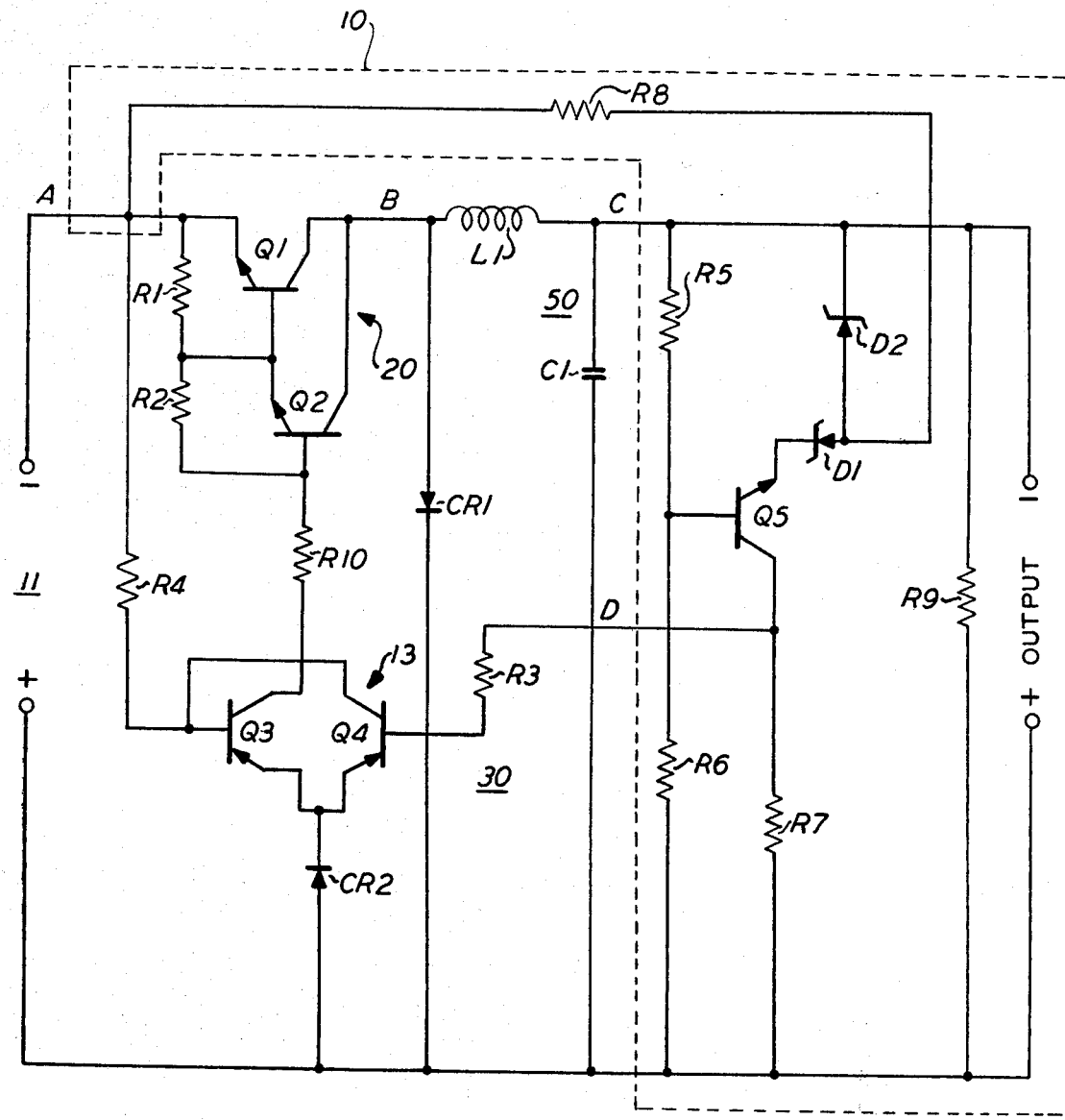

TEMPERATURE COMPENSATION FOR REGULATOR CIRCUIT

BACKGROUND OF THE INVENTION

Prior art methods of providing temperature compensation of transistor circuits are numerous and include the use of large-valued swamping resistors placed in the emitter circuit to overcome the small value of the emitter-base junction resistance. Another method is to reduce the emitter-base forward bias as temperature increases. Both these methods have the disadvantage of seriously reducing gain often requiring an extra stage of amplification which only compounds the compensation problem.

It has also been proposed to use thermistors or temperature-sensitive resistors. However, since state-of-the-art transistors have a negative temperature coefficient at the base-emitter junction, the use of a thermistor, which also has a negative temperature coefficient, requires careful circuit design efforts to cause the thermistor to have the desired effect for compensating the base-emitter characteristic without degrading circuit performance. A similar problem involves the use of diodes since they also exhibit a negative temperature coefficient.

SUMMARY OF THE INVENTION

The invention is directed to a temperature compensation circuit which makes use of the temperature coefficient of voltage characteristic of a pair of zener diodes connected in a back-to-back configuration. By suitably placing the diodes in circuit with the transistor to be compensated, the negative temperature coefficient of the base-emitter junction of the transistor is offset by the positive temperature coefficient which characterizes the zener diodes so combined.

The invention is particularly advantageous in conjunction with low voltage regulator circuits since temperature compensated zener diodes in the low voltage range are not available.

A further advantage is that temperature regulation can be obtained inexpensively with conventional low cost diodes rather than using very expensive temperature compensated diodes.

Still another advantage is that only a single supply voltage is required to achieve compensation.

The present invention provides a temperature compensation circuit which has a high degree of accuracy and an extremely small variation in output voltage with temperature change. By careful selection of components, the temperature change with voltage variation can be made zero.

BRIEF DESCRIPTION OF THE DRAWINGS

The FIGURE is a schematic circuit diagram of a temperature compensation network for a regulator in accordance with the present invention.

DESCRIPTION OF AN ILLUSTRATIVE EMBODIMENT

Referring to the drawing, a preferred embodiment of the invention includes a temperature compensating network 10 operatively associated with a switching regulator 30.

Regulator 30 is described in copending U.S. pat. application Ser. No. 347,185 filed Apr. 2, 1973, by David Morris and assigned to the assignee of the present invention, and is hereby incorporated by reference. Regulating circuit 30 forms no part of the present invention and is disclosed in order to better illustrate the operation of the temperature compensating network 10.

The switching regulator 30 includes a series pass switch 20 comprising NPN transistors Q1 and Q2 in a Darlington configuration with associated bias resistors R1 and R2. The outputs from the collectors of transistors Q1 and Q2 are tied together at line B to a "flyback energy" circuit 50 comprising inductor L1, energy storage capacitor C1, and diode CR1. This "flyback energy" circuit is coupled through line C to the temperature compensating network 10.

A DC input voltage source 11 is connected over line A to the series pass switch 20, the output of which is coupled over line B to flyback energy circuit 50. An output sensing circuit includes series-connected resistors R5 and R6, connected between line C and ground. The junction of resistors R5 and R6 is fed to the base of transistor sensing amplifier Q5.

The collector of transistor Q5 is coupled to ground through resistor R7. The output of the sensing circuit is taken at the collector of transistor Q5 and is fed via resistor R3 to a switching amplifier 13. The emitter of transistor Q5 is connected to the cathode of a zener diode D1. Another zener diode D2 is connected back-to-back with diode D1 and has its anode connected to line C.

Switching amplifier 13 comprises a pair of transistors Q3 and Q4 connected with biasing diode CR2 for operation as a Schmitt trigger. Switching regulator 30 operates to maintain a constant and regulated output voltage as load and line conditions vary.

Briefly summarizing the operation of the switching regulator 30, when the load voltage across resistor R9 decreases, the voltage drop across resistors R5 and R6 also decreases and the base drive of transistor Q5 is decreased, tending to move its operating point closer towards the cutoff region. The current through resistor R7 decreases and the base drive feeding transistor Q4 of the switching amplifier 13 decreases, turning Q4 off.

The collector of transistor Q4 is connected to the base of transistor Q3, therefore, when Q4 is turned off, the the base of Q3 becomes more negative turning it on.

Turning Q3 on causes collector current to flow from it through resistor R10 to the base of transistor Q2 turning pass switch 20 on, which permits more current to flow from the source 11 to the load R9. At the same time, a magnetic field builds around inductor L1 and capacitor C1 charges up. When the voltage across the load R9 increases, the voltage developed across resistors R5, R6 also increases, and sensing amplifier Q5 is turned on harder. The base drive to transistor Q4 increases as the voltage across resistor R7 increases and transistor Q4 is turned on which places a more positive voltage at the base of transistor Q3 turning it off. With transistor Q3 off, the base drive to transistor Q2 decreases and pass switch 20 is turned off.

With pass switch 20 turned off, current from the supply 11 decreases and the magnetic field around inductor L1 collapses thereby inducing a voltage across L1 which keeps capacitor C1 charged through flyback diode D1. As capacitor C1 discharges through the load R9, and resistors R6 and R5, the base drive of transistor Q5 is decreased and the regulation cycle begins once again.

The temperature compensation network 10 includes a zener diode D1 having its cathode connected to the emitter of transistor Q5 and its anode connected directly to the anode of zener diode D2. The two zener diodes D1 and D2 are thus connected back-to-back and the common junction is coupled through resistor R8 to the input voltage source 11.

From circuit theory it is evident that the voltage across resistor R5, $V_{R5}$, is equal to the base-to-emitter junction voltage, $V_{BE}$, of transistor Q5 plus the voltage across zener diode D1, $V_{D1}$, minus the voltage across zener diode D2, $V_{D2}$. The load voltage across resistor R9 equals the combined voltage drops across series--connected resistors R5 and R6 or $V_{out} = V_{R5} + V_{R6}$. Substituting for $V_{R5}$, $V_{out} = V_{Be} + V_{D1} - V_{D2} + V_{R6}$. In order to maintain the load voltage constant despite temperature variations, $V_{R5}$ and $V_{R6}$ must remain constant as temperature varies. Since $V_{R5} = V_{Be} + V_{D1} - V_{D2}$, then any change in one of these variables will cause a change in $V_{R5}$ which can be expressed as follows: $\Delta V_{R5} = \Delta V_{BE} + \Delta V_{D1} - \Delta V_{D2}$.

State-of-the-art transistors are characterized by a negative temperature coefficient of voltage at the base-emitter junction. Thus, if the combined temperature coefficients of zener diodes D1 and D2 are selected to offset the base-emitter temperature coefficient of Q5, then $\Delta V_{R5}$ can be made to approach zero. This may be expressed as $\Delta V_{R5} = \Delta V_{Be} + \Delta V_{D1} - \Delta V_{D2} \approx 0$.

In one actually-constructed embodiment, Q5 was a Motorola type MPSA13 having a temperature coefficient (TC) of approximately −4 millivolts per degree Centigrade (mV/°C). Zener D1 was a Motorola type IN5232B having a zener voltage of 5.6v. and a maximum temperature coefficient of +0.038 percent per degree Centigrade (%/°C)or 2.13mV/°C and D2 was a Motorola type IN5228B having a zener voltage of 3.9V with a maximum TC of −0.06%/°C or 2.34mV/°C.

Typically, the TC of diode D1 = +1.9mV/°C and that of diode D2 = −2.1V/°C. For these typical valves, $\Delta V_{D1} - \Delta V_{D2} = (+1.9) - (-2.1) = + $ 4mV/°C and $\Delta V_{R5} = (-4) + (4) \approx 0$ mV/°C.

In accordance with the invention, the designer is not limited to using the above types of diodes. Any diode combination which satisfies the condition: $\Delta V_{R5} = \Delta V_{BE} + \Delta V_{D1} - \Delta V_{D2} \approx 0$ may be used. In general, zener diodes below a 5 volt breakdown have a negative TC and above a 5 volt breakdown have a positive TC.

The remaining components are selected to insure proper circuit operation. For instance, transistor Q5 must not be permitted to saturate for proper operation of the switching regulator 30. Resistor R8 is selected so that zener diodes D1 and D2 are forward-biased—the suggested design current for the diodes used in the example is about 7.5ma. A current of 7.5ma also flows through transistor Q5 and zener diode D2 by suitable selection of resistor R7.

Accordingly, temperature compensation of the portion of the circuit shunting resistor R5 has been achieved by choosing zener diodes D1 and D2 to have temperature coefficients to offset and cancel the temperature coefficient of the base-emitter junction of transistor Q5.

| CIRCUIT DATA FOR ILLUSTRATED EMBODIMENT | | | |
|---|---|---|---|
| Q1 | MJE243 | R1 | 100 ohms |
| Q2 | 2N4401 | R2 | 1000 ohms |
| Q3 | 2N4403 | R3 | 620 ohms |
| Q4 | 2N4403 | R4 | 160 Kohms |
| Q5 | MPSA13 | R5 | 1.5 Kohms |
| D1 | 1N5232B | R6 | 1 Kohm |
| D2 | 1N5228B | R7 | 100 ohms |
| CR1 | 1N4934 | R8 | 510 ohms |
| CR2 | 1N4002 | R9 | Load |
| L1 | 0.5 mH | R10 | 16 Kohms |
| C1 | 4.7 mf | V11 | 17 volts |
| $V_{out}$ for $R_9 = 10$ ohms and current through | | | |
| $R_9 = 0.5a$ | | at 0°C — 5.08v. | |
| | | at 28°C — 5.06v. | |
| | | at 60°C — 4.97v. | |

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A temperature compensation circuit adapted to be inserted between a source of input voltage and a load comprising:
   transistor means having a predetermined value of voltage temperature coefficient between first and second electrodes thereof;
   zener diode means connected in series to said first electrode;
   said zener diode means having a value of zener breakdown voltage in a relatively low range;
   said transistor means and zener diode means being coupled to said source;
   said zener diode means comprising a pair of zener diodes connected in a back-to-back configuration to thereby provide a net voltage temperature coefficient value being the difference between the temperature coefficients of each of said diodes and to thereby also provide said zener breakdown voltage value being the difference between the zener breakdown voltage values of each of said diodes;
   said net temperature coefficient value also being opposite in algebraic sign and of the same magnitude as said transistor means voltage temperature coefficient value whereby,
   temperature compensation is achieved along the circuit path between said transistor means second electrode and including said zener diode means as a result of said net temperature coefficient value having the effect of cancelling said transistor means voltage temperature coefficient value during circuit operation, while permitting a value of zener breakdown voltage in said relatively low range.

2. A temperature compensation circuit as set forth in claim 1, wherein:
   said transistor means electrodes include a base electrode, emitter electrode and collector electrode;
   said zener diode means being connected to said emitter electrode.

3. A temperature compensation circuit as set forth in claim 2, wherein:
   said first and second electrodes correspond to said base and emitter electrodes.

4. A temperature compensation circuit as set forth in claim 3 wherein:

a first electrode of a first one of said zener diodes is connected to said transistor means emitter electrode, said diodes being connected back-to-back at the second electrode of said first zener diode and the corresponding electrode of said second zener diode.

5. A temperature compensation circuit as set forth in claim 4 wherein:

the output of said temperature compensation circuit is taken from said corresponding electrode of said second zener diode.

6. A temperature compensation circuit as set forth in claim 5 further including:

resistance means adapted for connection across said source;

the base electrode of said transistor means being connected to said resistance means.

* * * * *